US010538320B2

(12) United States Patent
Dai

(10) Patent No.: US 10,538,320 B2
(45) Date of Patent: Jan. 21, 2020

(54) CENTRAL-POSITIONED PITCH CONTROL DEVICE FOR A COAXIAL HELICOPTER

(71) Applicant: QINGAN GROUP CO., LTD., Xi'an (CN)

(72) Inventor: Mengyi Dai, Xi'an (CN)

(73) Assignee: QINGAN GROUP CO., LTD., Xi'an (CN)

( * ) Notice: Subject to any disclaimer, the term of this patent is extended or adjusted under 35 U.S.C. 154(b) by 424 days.

(21) Appl. No.: 15/383,721

(22) Filed: Dec. 19, 2016

(65) Prior Publication Data

US 2017/0096220 A1    Apr. 6, 2017

Related U.S. Application Data

(63) Continuation of application No. PCT/CN2014/082245, filed on Jul. 15, 2014.

(30) Foreign Application Priority Data

Jun. 19, 2014 (CN) .......................... 2014 1 0275790

(51) Int. Cl.
| B64C 27/80 | (2006.01) |
| B64C 27/605 | (2006.01) |
| B64C 11/30 | (2006.01) |
| B64C 11/36 | (2006.01) |
| B64C 11/42 | (2006.01) |

(Continued)

(52) U.S. Cl.
CPC ............ B64C 27/80 (2013.01); B64C 11/306 (2013.01); B64C 11/36 (2013.01); B64C 11/42 (2013.01); B64C 27/10 (2013.01); B64C 27/605 (2013.01); B64C 27/12 (2013.01)

(58) Field of Classification Search
CPC ....... B64C 27/80; B64C 27/10; B64C 27/605; B64C 27/59; B64C 11/206; B64C 11/1142
See application file for complete search history.

(56) References Cited

U.S. PATENT DOCUMENTS 2,474,362 A * 6/1949 Keranen ................. B64C 27/54
                                                        416/115
4,531,692 A    7/1985 Mateus
(Continued)

FOREIGN PATENT DOCUMENTS

| CA | 2562570 C | 6/2011 |
| CN | 102658865 A | 9/2012 |
| WO | 2008091298 A3 | 10/2008 |

OTHER PUBLICATIONS

International Search Report issued in corresponding International Application No. PCT/CN2014/082245 dated Feb. 27, 2015 (5 pages).

(Continued)

*Primary Examiner* — Bryan M Lettman
*Assistant Examiner* — Timothy P Solak
(74) *Attorney, Agent, or Firm* — Osha Liang LLP

(57) ABSTRACT

A central-positioned pitch control device used in a coaxial helicopter includes an upper propeller hub; a lower propeller hub; a first blade mounted on the outside of the upper propeller hub; a second blade mounted on the outside of the lower propeller hub; and a central-positioned pitch control device placed between the upper propeller hub and the lower propeller hub.

7 Claims, 2 Drawing Sheets

(51) Int. Cl.
 *B64C 27/10* (2006.01)
 *B64C 27/12* (2006.01)

(56) References Cited

U.S. PATENT DOCUMENTS

| | | | | |
|---|---|---|---|---|
| 5,364,230 A | * | 11/1994 | Krauss | B64C 27/20 |
| | | | | 416/134 A |
| 5,791,592 A | * | 8/1998 | Nolan | B64C 27/14 |
| | | | | 244/17.11 |
| 7,118,340 B2 | | 10/2006 | D'Anna | |
| 2009/0057482 A1 | * | 3/2009 | Lin | B64C 27/10 |
| | | | | 244/60 |
| 2011/0024554 A1 | * | 2/2011 | Monleau | B64C 27/10 |
| | | | | 244/17.23 |

OTHER PUBLICATIONS

Written Opinion issued in corresponding International Application No. PCT/CN2014/082245 dated Feb. 27, 2015 (3 pages).

\* cited by examiner

CENTRAL-POSITIONED PITCH CONTROL DEVICE FOR A COAXIAL HELICOPTER

TECHNICAL FIELD

This invention provides a central-positioned pitch control device used in coaxial helicopter, belonging to the technical field of helicopter structure.

BACKGROUND

The periodic pitch of current coaxial helicopter is realized by controlling the lower blade pitch with swashplate under the control of steering engine. To realize control over blade pitch of upper blade under the control of steering engine, it needs to firstly control lower swashplate, and then transfers motion to upper swashplate via link mechanism. Its weakness is: the transmission distance of pitch motion under the control of steering engine is long, involving more mechanisms, big accumulated error of fit clearances among many links, poor mechanism rigidity, and thus affecting the pitch control precision and control stability. The current pitch control of upper blade in the control of differential course of coaxial helicopter is realized by controlling connecting rod with steering engine, whereas the connecting rod can only control blade pitch of upper blade through the whole center shaft. Its weakness is: the transmission distance of motion is long; the structure is complicated and the manufacturing of center shaft is difficult; and thus it is not suitable for using in small-sized helicopters.

SUMMARY OF INVENTION

In one aspect, embodiments disclosed herein relate to a central-positioned pitch control device used in a coaxial helicopter that includes an upper propeller hub; a lower propeller hub; a first blade mounted on the outside of the upper propeller hub; a second blade mounted on the outside of the lower propeller hub; and a central-positioned pitch control device placed between the upper propeller hub and the lower propeller hub.

Other aspects and advantages of the invention will be apparent from the following description and the appended claims.

DETAILED DESCRIPTION

Embodiments disclosed herein generally relate to a central-positioned pitch control device used in a coaxial helicopter and designed for shortening motion transmission distance, decreasing conversion links, enhancing control precision and stability, as well as reducing manufacturing difficulty.

One or more embodiments, of a central-positioned pitch control device used in a coaxial helicopter is described by referring to the attached drawings.

Figure 1:
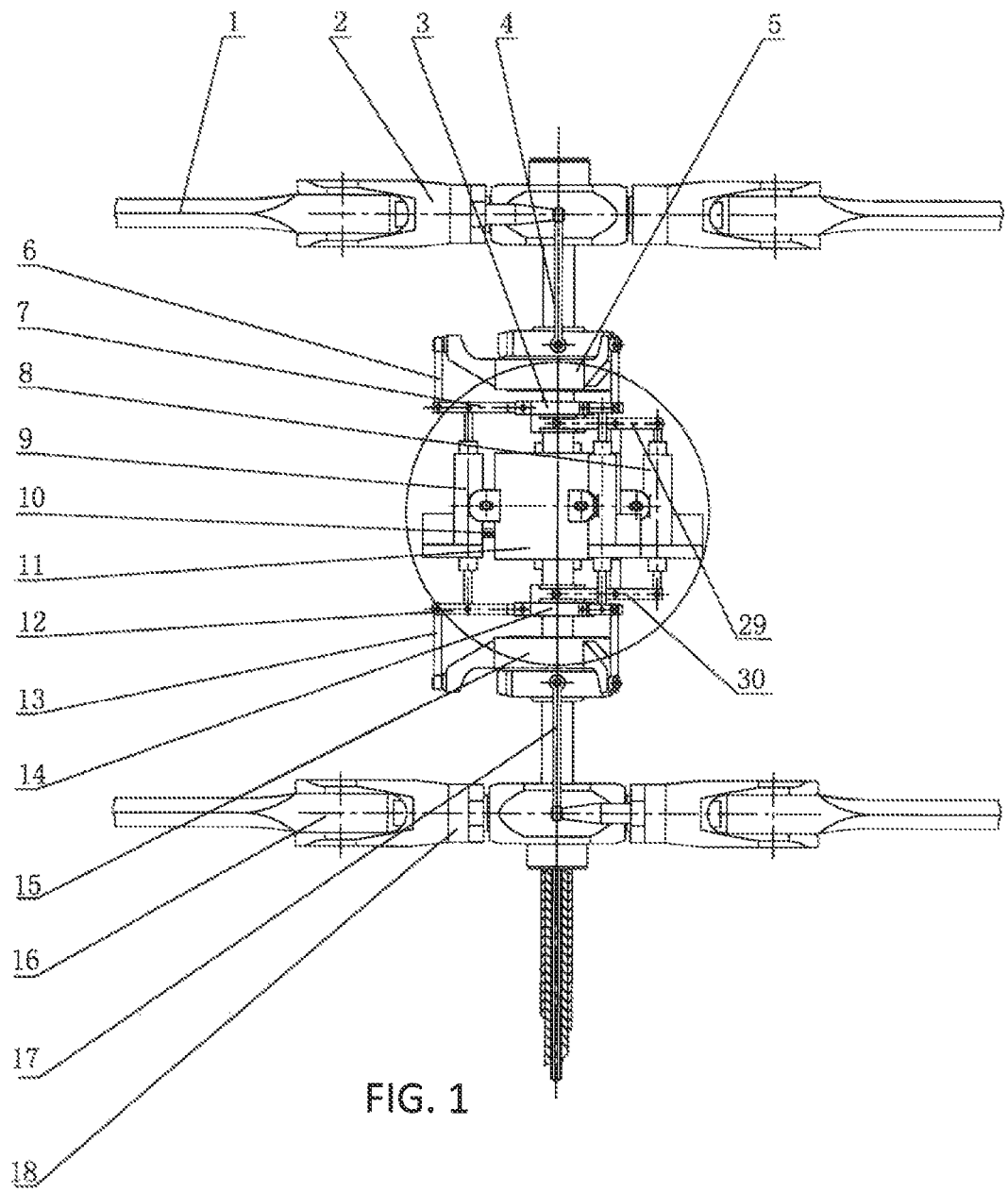
FIG. 1 shows the structure of a central-positioned pitch control device used in a coaxial helicopter.
Figure 2:
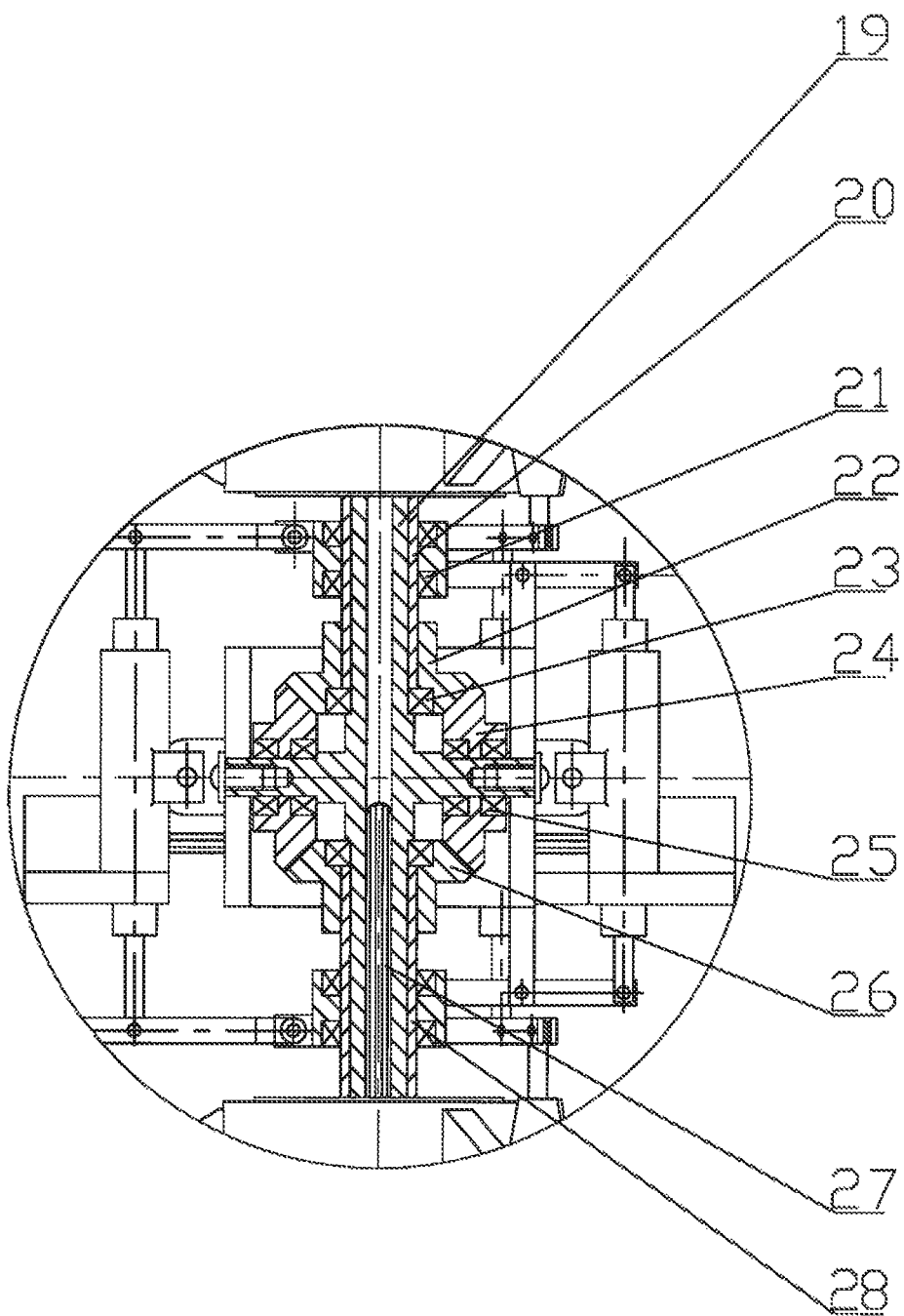
FIG. 2 shows a sectional view of the circled portion in FIG. 1.

FIGS. 1 and 2 give an introduction to one or more embodiments of a central-positioned pitch control device used in coaxial helicopter. FIG. 1 shows an upper propeller hub (2) and lower propeller hub (18). On the outside of upper propeller hub (2), blade I (1) is mounted, while on the outside of lower propeller hub (18), blade II (16) is mounted.

In FIG. 2, a feature is that the middle part of center shaft (19) appears a stepped cross arm uplifting along the circumference. On the upper end of cross arm outside the center shaft (19), upper outer shaft (20) is mounted, and on the lower end of cross arm outside the center shaft (19), the lower outer shaft (28) is mounted. The fan-shaped reversing gear (24) is mounted between the upper end face and lower end face of cross arm at the middle part of center shaft (19) via bearing (25).

In FIG. 1 on the outside of upper propeller hub (2), blade I (1) is mounted, while on the outside of lower propeller hub (18), blade II (16) is mounted.

In FIG. 2, on the upper end of lower outer shaft (28), conical gear I (26) is mounted, followed downward by lower variable pitch ring (14) and lower swashplate (15), with conical gear I (26) meshed with the lower part of fan-shaped reversing gear (24).

In FIG. 2, on the lower end of upper outer shaft (20), conical gear II (22) is mounted, followed upward by upper variable pitch ring (3) and upper swashplate (5), with the conical gear II (22) messed with the upper part of fan-shaped reversing gear (24).

In FIG. 1, on the outer ends of upper variable pitch ring (3) and lower variable pitch ring (14), the rocker I (7) and rocker II (12) are respectively mounted, with the outer ends of rocker I (7) and rocker II (12) respectively meshed with upper swashplate (5) and lower swashplate (15) via connecting rod I (6) and connecting rod II (13).

In FIG. 1, upper swashplate (5) and lower swashplate (15) are respectively meshed with upper propeller hub (2) and lower propeller hub (18) via connecting rod I (4) and connecting rod II (17).

When reviewing FIGS. 1 and 2 on outer end of cross arm at the middle part of the center shaft (19), gear box (11) is mounted. The gear box (11) includes the conical gear I (26) on the upper end of lower outer shaft (28), on the lower end of upper outer shaft (20), conical gear II (22) is mounted, and the fan-shaped reversing gear (24) mounted on the upper and lower end faces of cross arm at the middle part of center shaft (19) via bearing (25). Outside the gear box (11), main steering gear (9) and course steering gear (8) are mounted with main steering gear (9) meshed with the middle parts of rocker I (7) and rocker II (12) via upper and lower output shafts. And course steering gear (8) is meshed with one ends of upper rocker (29) and lower rocker (30) via its upper and lower output shafts, while the other ends of upper rocker (29) and lower rocker (30) are respectively meshed with upper variable pitch ring (3) and lower variable pitch ring (14), and middle parts of upper rocker (29) and lower rocker (30), respectively meshed with gear box (11).

The working principle and process of one or more embodiments of the present invention device is as follows: when center shaft (19) is fixed, first making lower outer shaft (28) to rotate, activating lower propeller hub (18) and gear (26) to rotate, and then driving gear (22) and upper outer axis (20) to rotate via gear (24), and reversing the rotation of upper outer axis (20) and lower outer shaft (28), and then the upper outer axis (20) will activate the rotation of upper propeller hub (2). Making the upper and lower output shafts of main steering gear (9) moving in the same direction, then upper output shaft drives rocker I (7) to swing, and connecting rod (6), upper swashplate (5), connecting rod (4) and upper propeller hub (2) to rotate, hence implementing the angle of attack control of blade I (1), while the angle of attack control of blade II (16) is the same as above. The upper and lower output shafts of course steering gear (8) start reverse motion, with upper output shaft driving rocker (29) to swing, upper variable pitch ring (3) to move upward and downward, and then activating rocker I (7) to swing, connecting rod (6), upper swashplate (5), connecting rod (4) and upper propeller hub (2) to rotate, hence implementing the principal distance control of blade I (1), while the principal distance control of blade II (16) is the same as above. Thus, the course control of helicopter may be implemented by controlling the principal distance differentials of blade I (1) and blade II (16).

Compared with the existing technology, this invention device has such advantages as simple structure, high control precision, good stability and small manufacturing difficulty, and thus leaving the helicopter more space.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A central-positioned pitch control device used in a coaxial helicopter, comprising:
   an upper propeller hub;
   a lower propeller hub;
   a first blade mounted on the outside of the upper propeller hub;
   a second blade mounted on the outside of the lower propeller hub; and
   a central-positioned pitch control device placed between the upper propeller hub and the lower propeller hub,
   wherein the central-positioned pitch control device used in the coaxial helicopter is placed in a middle part of a center shaft between the upper propeller hub and the lower propeller hub,
   wherein the middle part of the center shaft has a stepped cross arm uplifting along the circumference, and on an upper end of the cross arm outside the center shaft, an upper outer shaft is installed, and on a lower end of the cross arm outside the center shaft, a lower outer shaft is installed, and
   wherein on an upper end of the lower outer shaft, a first conical gear is installed, followed downward by a lower variable pitch ring and a lower swashplate, and the first conical gear is meshed with a lower part of a fan-shaped reversing gear.

2. The device of claim 1, wherein the fan-shaped reversing gear is placed between an upper end face and a lower end face of the cross arm at the middle part of the center shaft through a bearing.

3. The device of claim 1, wherein on a lower end of the upper outer shaft, a second conical gear is installed, followed upward by an upper variable pitch ring and an upper swashplate; and the second conical gear is meshed with an upper part of the fan-shaped reversing gear.

4. The device of claim 3, wherein on outer ends of the upper variable pitch ring and the lower variable pitch ring, a first rocker and a second rocker are respectively installed; outer ends of the first rocker and the second rocker are respectively jointed with the upper swashplate and the lower swashplate through a first connecting rod and a second connecting rod; and the upper swashplate and the lower swashplate are respectively jointed with the upper propeller hub and the lower propeller hub through a third connecting rod and a fourth connecting rod.

5. The device of claim 1, wherein on an outer end of the cross arm at the middle part of the center shaft, a gear box is installed.

6. The device of claim 5, wherein the gear box contains the first conical gear on the upper end of the lower outer shaft, a second conical gear on the lower end of the upper outer shaft, and the fan-shaped reversing gear is installed on an upper end face and a lower end face of the cross arm at the middle part of the center shaft through a bearing.

7. The device of claim 5, wherein outside the gear box, a main steering gear and a course steering gear are installed, the main steering gear is jointed with middle parts of a first rocker and a second rocker through upper and lower output shafts, and the course steering gear is jointed with one end of an upper rocker and a lower rocker through upper and lower output shafts, while the other ends of the upper rocker and the lower rocker are respectively jointed with an upper variable pitch ring and the lower variable pitch ring, and the middle parts of the upper rocker and the lower rocker, are respectively jointed with the gear box.

* * * * *